(12) United States Patent
Fukushima et al.

(10) Patent No.: US 8,680,221 B2
(45) Date of Patent: Mar. 25, 2014

(54) METHOD FOR PRODUCING DIALLYLAMINE ACETATE POLYMER

(75) Inventors: Yusuke Fukushima, Fukushima (JP); Yasuhito Nakata, Fukushima (JP); Hiroyuki Takayama, Fukushima (JP)

(73) Assignee: Nitto Boseki Co., Ltd., Fukushima (JP)

( * ) Notice: Subject to any disclaimer, the term of this patent is extended or adjusted under 35 U.S.C. 154(b) by 0 days.

(21) Appl. No.: 13/641,970

(22) PCT Filed: Apr. 11, 2011

(86) PCT No.: PCT/JP2011/058976
§ 371 (c)(1),
(2), (4) Date: Dec. 11, 2012

(87) PCT Pub. No.: WO2011/132558
PCT Pub. Date: Oct. 27, 2011

(65) Prior Publication Data
US 2013/0079480 A1    Mar. 28, 2013

(30) Foreign Application Priority Data
Apr. 19, 2010   (JP) ................................ 2010-095748

(51) Int. Cl.
*C08F 4/04*   (2006.01)
*C08F 26/06*   (2006.01)

(52) U.S. Cl.
USPC .................... 526/204; 526/218.1; 526/259

(58) Field of Classification Search
USPC ...................................... 526/204, 218.1, 259
See application file for complete search history.

(56) References Cited

U.S. PATENT DOCUMENTS

| 4,504,640 A | 3/1985 | Harada et al. |
| 4,812,540 A | 3/1989 | Kageno et al. |
| 4,864,007 A * | 9/1989 | Schleusener ............... 526/218.1 |

FOREIGN PATENT DOCUMENTS

| JP | 58-201811 | 11/1983 |
| JP | 60-88018 | 5/1985 |
| JP | 63-23911 | 2/1988 |
| JP | 3-109407 | 5/1991 |
| JP | 2005-2196 | 1/2005 |
| JP | 2006-45309 | 2/2006 |

OTHER PUBLICATIONS

Search report from International Application No. PCT/JP2011/058976, mail date is Jul. 12, 2011.
International Preliminary Report on Patentability and Written Opinion for PCT/JP2011/058976, mail date is Nov. 15, 2012.

* cited by examiner

*Primary Examiner* — William Cheung
(74) *Attorney, Agent, or Firm* — Greenblum & Bernstein, P.L.C.

(57) ABSTRACT

Provided is a method for producing a diallylamine acetate polymer comprising polymerizing diallylamine acetate in water or a polar solvent in the presence of a radical initiator, the radical initiator being an organic acid addition salt of a specific cyclic amidinoazo compound, and a diallylamine acetate polymer solution free of halogen.

5 Claims, No Drawings

METHOD FOR PRODUCING DIALLYLAMINE ACETATE POLYMER

TECHNICAL FIELD

The present invention relates to a method for producing a diallylamine acetate polymer, and to a diallylamine acetate polymer solution. More specifically, the invention relates to a method for efficiently producing a diallylamine acetate polymer that is readily usable in the field of fine chemicals or the like due to its non-halogen (i.e. halogen-free) nature, and a diallylamine acetate polymer solution free of halogens and inorganic substances which was previously difficult to produce.

BACKGROUND ART

Due to the fact that diallylamine hydrochloride polymers are nowadays easily producible by polymerization of diallylamine hydrochloride monomers in an aqueous solution in the presence of a radical polymerization catalyst and that they are water-soluble cationic polymers, diallylamine hydrochloride polymers have been industrially manufactured and their use has been proposed in diverse fields such as in metal protection agents, inkjet recording applications and electronic materials.

However, since diallylamine hydrochloride polymers contain a halogen, they could be difficult to use in some applications such as ceramic binders and any applications that involve contact with a metal where the halogen may cause corrosion. Therefore, as use of diallylamine hydrochloride polymers or the likes is increasingly contemplated in the field of fine chemicals, non-halogen polymers are beginning to be sought after.

Known methods for producing such a polymer include a method in which an alkali metal acetate is added to a diallylamine hydrochloride polymer and the resulting mixture is subjected to ion-exchange membrane electrodialysis to remove chloride ions, which are halogen, and to obtain a non-halogen diallylamine acetate polymer (Patent Document 1). Also known is a method in which a diallylamine hydrochloride polymer is desalted by neutralizing it with sodium hydroxide to remove chloride ions and to obtain a free diallylamine polymer (Patent Document 2). However, these methods are time-consuming and expensive, and moreover, they may not be able to produce a completely halogen-free polymer.

RELATED-ART DOCUMENTS

Patent Documents

Patent Document 1: JP 2005-2196 A
Patent Document 2: JP 2006-45309 A

SUMMARY OF THE INVENTION

Technical Problem

In view of the above-mentioned problems, an object of the invention is to provide a method for efficiently producing a diallylamine acetate polymer that is readily usable in the field of fine chemicals or the like due to its completely non-halogen nature, and to provide a diallylamine acetate polymer solution.

Solution to the Problem

The present inventors have conducted extensive research in order to achieve the above object. As a result, the inventors have found that a diallylamine acetate polymer and a diallylamine acetate polymer solution that are completely free from halogens and inorganic substances can be efficiently produced by polymerizing diallylamine acetate in water or a polar solvent in the presence of an organic acid addition salt of a specific cyclic amidinoazo compound as a radical initiator. This finding has led to the completion of the invention.

Thus, the present invention provides the following:

[1] A method for producing a diallylamine acetate polymer comprising polymerizing diallylamine acetate in water or a polar solvent in the presence of a radical initiator, the radical initiator being an organic acid addition salt of a cyclic amidinoazo compound shown by a general formula (I),

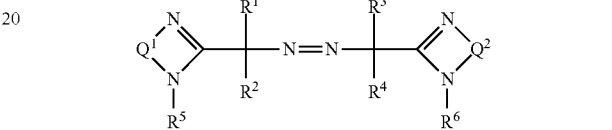

wherein $R^1$, $R^2$, $R^3$ and $R^4$ independently represent an alkyl group having 1 to 3 carbon atoms, $R^5$ and $R^6$ independently represent a hydrogen atom, an alkyl group having 1 to 3 carbon atoms or a hydroxyethyl group, and $Q^1$ and $Q^2$ independently represent an alkylene or alkenylene group having 2 to 4 carbon atoms that may be substituted with an alkyl group having 1 to 3 carbon atoms or a hydroxyl group.

[2] The method according to [1], wherein the organic acid addition salt is an acetic acid addition salt.

[3] The method according to [1] or [2], wherein the diallylamine acetate monomer concentration is 15 to 60 mass %.

[4] A diallylamine acetate polymer solution that does not comprise a halogen or an inorganic substance.

Advantageous Effects of the Invention

According to the present invention, a diallylamine acetate polymer that may be easily used in the field of fine chemicals or the like due to its non-halogen nature can be industrially produced in a quick and inexpensive manner. Moreover, according to the present invention, a diallylamine acetate polymer solution that is completely free of halogens and inorganic substances can be obtained. The diallylamine acetate polymer solution obtained according to the invention may greatly contribute to the field of fine chemicals and the likes where absence of halogens and inorganic substances is required.

DESCRIPTION OF EMBODIMENTS

A method for producing a diallylamine acetate polymer according to the invention is characterized by a step of polymerizing diallylamine acetate in water or a polar solvent in the presence of a radical initiator, the radical initiator being an organic acid addition salt of a cyclic amidinoazo compound shown by the following general formula (I),

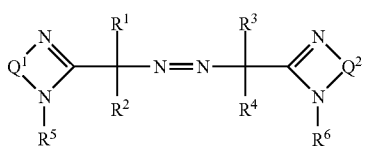

wherein $R^1$, $R^2$, $R^3$ and $R^4$ independently represent an alkyl group having 1 to 3 carbon atoms, $R^5$ and $R^6$ independently represent a hydrogen atom, an alkyl group having 1 to 3 carbon atoms or a hydroxyethyl group, and $Q^1$ and $Q^2$ independently represent an alkylene or alkenylene group having 2 to 4 carbon atoms that may be substituted with an alkyl group having 1 to 3 carbon atoms or a hydroxyl group.

The term "diallylamine" used herein refers to diallylamine in a narrow sense that is represented by the chemical formula $(CH_2=CHCH_2)_2NH$ and has a CAS number of 124-02-7. Diallylamine acetate used in the invention may be provided in the form of isolated diallylamine acetate or as a mixture of diallylamine, acetic acid, and water or a polar solvent which is used as polymerization solvent.

To the extent that the object of the invention is not hindered, other monomers besides diallylamine acetate may be included at an amount of preferably 15 mol % or less, more preferably 10 mol % or less, and still more preferably 5 mol % or less relative to the diallylamine acetate, to be copolymerized with diallylamine acetate. Examples of such additional monomers include acrylamide, methacrylamide, sulfur dioxide, and the like.

The radical initiator used in the invention is an organic acid addition salt of a cyclic amidinoazo compound shown by the following general formula (I).

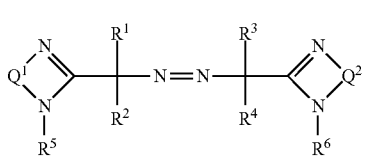

$R^1$, $R^2$, $R^3$ and $R^4$ in the general formula (I) independently represent an alkyl group having 1 to 3 carbon atoms. Examples of the alkyl group having 1 to 3 carbon atoms include a methyl group, an ethyl group, and a propyl group. $R^5$ and $R^6$ independently represent a hydrogen atom, an alkyl group having 1 to 3 carbon atoms, or a hydroxyethyl group.

$Q^1$ and $Q^2$ independently represent an alkylene or alkenylene group having 2 to 4 carbon atoms, which may be substituted with an alkyl group having 1 to 3 carbon atoms or a hydroxyl group.

Examples of the alkylene group having 2 to 4 carbon atoms represented by $Q^1$ and $Q^2$ include an ethylene group, a trimethylene group, and a tetramethylene group. Examples of the alkenylene group having 2 to 4 carbon atoms represented by $Q^1$ and $Q^2$ include a vinylene group, a propenylene group, and a butenylene group.

Specific examples of the cyclic amidinoazo compounds include
2,2'-azobis[2-(2-imidazolin-2-yl)propane],
2,2'-azobis[2-(5-methyl-2-imidazolin-2-yl)propane],
2,2'-azobis{2-[1-(2-hydroxyethyl)-2-imidazolin-2-yl]propane},
2,2'-azobis[2-(3,4,5,6-tetrahydropyrimidin-2-yl)propane],
2,2'-azobis[2-(5-hydroxy-3,4,5,6-tetrahydropyrimidin-2-yl)propane], and
2,2'-azobis[2-(4,5,6,7-tetrahydro-1H-1,3-diazepin-2-yl)propane].

The organic acid that forms the organic acid addition salt in the radical initiator of the invention is preferably a halogen-free organic acid. Examples of the halogen-free organic acids include halogen-free organic carboxylic acids and halogen-free organic sulfonic acids. Examples of the halogen-free organic carboxylic acids include acetic acid, propionic acid, butyric acid, malonic acid, succinic acid, malic acid, tartaric acid, and the like. Examples of the halogen-free organic sulfonic acids include methanesulfonic acid, ethanesulfonic acid, propanesulfonic acid, and the like. Among these, acetic acid is most preferable due to easy handling and water-solubility of the resulting polymer. The cyclic amidinoazo compound comprises two amidino groups in one molecule. Therefore, if the organic acid is a monobasic organic acid, the amount of the organic acid used to generate the organic acid addition salt is preferably two-fold molar excess relative to the cyclic amidinoazo compound. If the organic acid is a dibasic organic acid, the amount the organic acid used to generate the organic acid addition salt is preferably equimolar relative to the cyclic amidinoazo compound. Use of a free (i.e. non-salt) cyclic amidinoazo compound as the radical initiator would result in lower polymerization yields.

Examples of the radical initiators that may be used in the invention include
2,2'-azobis[2-(2-imidazolin-2-yl)propane]diacetate,
2,2'-azobis[2-(5-methyl-2-imidazolin-2-yl)propane]diacetate,
2,2'-azobis{2-[1-(2-hydroxyethyl)-2-imidazolin-2-yl]propane}diacetate,
2,2'-azobis[2-(3,4,5,6-tetrahydropyrimidin-2-yl)propane]diacetate,
2,2'-azobis[2-(5-hydroxy-3,4,5,6-tetrahydropyrimidin-2-yl)propane]diacetate, and
2,2'-azobis[2-(4,5,6,7-tetrahydro-1H-1,3-diazepin-2-yl)propane]diacetate.

The polymerization solvent used in the present invention is water or a polar solvent. Examples of the polar solvents include organic solvents such as alcohols, dimethylsulfoxide, and dimethylformamide. A mixed solvent comprising water and any of these organic solvents may also be used. It is most preferable to use water alone as polymerization solvent due to its safeness, easy handling, and versatility.

The amount of the radical initiator used in the present invention is preferably larger than in an ordinary polymerization reaction in order to improve the polymerization yields. The amount of the radical initiator used is preferably 3 mol % or more, more preferably 4 to 30 mol %, and particularly preferably 5 to 20 mol % relative to the diallylamine acetate.

The polymerization temperature employed may be varied depending on the chemical structure of the initiator, but it is preferably 30 to 100° C. and more preferably 40 to 70° C.

For obtaining high polymerization yields in polymerization of a cationic monomer in general, it is usually preferable to use a starting concentration of the monomer on the high side within its solubility range, for example higher than 60 mass %. However, in the present invention, the starting concentration of the allylamine acetate monomer is preferably 10 to 70 mass %, more preferably 15 to 60 mass %, and unexpectedly, a starting monomer concentration of 20 to 55 mass % is particularly preferable, in order to obtain high polymerization yields.

When the monomer concentration is within the above ranges, high polymerization yields (e.g. 70% or better) of the diallylamine acetate polymer can be obtained. The resulting diallylamine acetate polymer may have a weight average molecular weight of 2000 to 6500. Polymers having various molecular weights can be obtained by varying the monomer concentration.

In the invention, since a halogen-free organic acid is used in the organic acid addition salt radical initiator, a solution of diallylamine acetate polymer that is completely free of halogens and inorganic substances can also be obtained following the polymerization reaction. This was confirmed by ion chromatography analyses. In this case, the solution can be directly used in various applications without undergoing a purification step.

EXAMPLES

The invention is described below in further details by representative Examples, but the invention is not limited to these Examples.

The weight average molecular weights and the polymerization yields of the obtained polymers were measured by GPC using a high-performance liquid chromatograph "L-6000" (manufactured by Hitachi, Ltd.). The eluent pump was provided by Hitachi L-6000. A Shodex RI SE-61 differential refractometer was used as detector. The column consisted of aqueous gel filtration columns "Asahipak GS-220HQ" (exclusion limit: 3000) and "Asahipak GS-620HQ" (exclusion limit: 2,000,000) connected to each other. The sample (20 μl) was prepared to a concentration of 0.5 g/100 ml in the eluent solution. The eluent solution was a 0.4 mol/l sodium chloride aqueous solution. The column temperature was 30° C. and the flow rate was 1.0 ml/min. A calibration curve was drawn by using as standard samples ten types of polyethylene glycol (molecular weight: 106, 194, 440, 600, 1470, 4100, 7100, 10300, 12600, or 23000) and the weight average molecular weight of the polymer was determined based on this calibration curve. The polymerization yield was calculated from the peak area of each component in the chromatogram.

Examples 1 to 5

Synthesis of Diallylamine Acetate Polymer Using the Method of the Invention

A four-necked separable flask (300 ml) equipped with a stirrer, a condenser and a thermometer was charged with diallylamine acetate (140.0 g) aqueous solutions having various monomer concentrations (mass %) and heated to 60° C. An aqueous solution of 2,2'-azobis[2-(2-imidazolin-2-yl)propane]diacetate ("VA-061" manufactured by Wako Pure Chemical Industries, Ltd.; 6 mol % relative to the diallylamine acetate) was added to the above-mentioned solutions and polymerization was carried out at the same temperature for 18 hours. After completion of the reaction, a sample of the resulting diallylamine acetate polymer aqueous solution was taken and subjected to GPC to measure weight average molecular weight and polymerization yield. The results are shown in Table 1. The target polymer could be obtained in high yields (i.e., yields of 78% or higher) when the monomer concentration used for polymerization was 20 to 60 mass %. The resulting polymers had weight average molecular weights of 2400 to 6200. Polymers differing in molecular weights could be obtained by changing the monomer concentrations. Chlorine was not detected from any of the resulting polymers by an ion chromatograph provided with a combustion pretreatment system (the detection limit was 50 ppm or lower relative to the polymer). An inorganic substance was also not detected from any of the resulting polymers by ash analysis (residues obtained following 600° C. heating for 1 hour were analyzed) (the detection limit was 0.1% or lower relative to the polymer).

TABLE 1

| Examples | Monomer concentration for polymerization (%) | Molecular weight | Polymerization yield (%) |
| --- | --- | --- | --- |
| Example 1 | 20 | 2400 | 83 |
| Example 2 | 30 | 3200 | 88 |
| Example 3 | 40 | 4200 | 92 |
| Example 4 | 50 | 6200 | 95 |
| Example 5 | 60 | 4700 | 78 |

Comparative Example 1

Synthesis of Diallylamine Acetate Polymer Using Ammonium Persulfate

A diallylamine acetate polymer was produced in the same manner as in Example 4, except that ammonium persulfate was used instead of 2,2'-azobis[2-(2-imidazolin-2-yl)propane]diacetate as the initiator. The weight average molecular weight of the resulting diallylamine acetate polymer was 5000 and the polymerization yield was 30%.

Comparative Example 2

Synthesis of Diallylamine Acetate Polymer Using a Non-Salt Cyclic Amidinoazo Compound A diallylamine acetate polymer was produced in the same manner as in Example 4, except that 2,2'-azobis[2-(2-imidazolin-2-yl)propane] powder was used instead of the aqueous solution of 2,2'-azobis[2-(2-imidazolin-2-yl)propane]diacetate and the monomer concentration was changed to 65%. The weight average molecular weight of the resulting diallylamine acetate polymer was 2800 and the polymerization yield was 41%.

INDUSTRIAL APPLICABILITY

According to the present invention, a completely halogen-free and inorganic substance-free diallylamine acetate polymer, which was previously difficult to obtain, can be produced in an industrial scale in a time- and cost-effective manner. The diallylamine acetate polymer and the diallylamine acetate polymer solution obtained according to the invention may be used in the fine chemical field and the like where halogen-free and inorganic substance-free products are required.

The invention claimed is:

1. A method for producing a diallylamine acetate polymer comprising polymerizing diallylamine acetate in water or a polar solvent in the presence of a radical initiator, the radical initiator being an organic acid addition salt of a cyclic amidinoazo compound shown by a general formula (I),

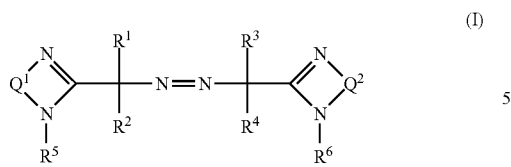 (I)

wherein $R^1$, $R^2$, $R^3$, and $R^4$ independently represent an alkyl group having 1 to 3 carbon atoms, $R^5$ and $R^6$ independently represent a hydrogen atom, an alkyl group having 1 to 3 carbon atoms or a hydroxyethyl group, and $Q^1$ and $Q^2$ independently represent an alkylene or alkenylene group having 2 to 4 carbon atoms that may be substituted with an alkyl group having 1 to 3 carbon atoms or a hydroxyl group.

2. The method according to claim 1, wherein the organic acid addition salt is an acetic acid addition salt.

3. The method according to claim 1, wherein the diallylamine acetate monomer concentration is 15 to 60 mass %.

4. A diallylamine acetate polymer solution that does not comprise a halogen or an inorganic substance.

5. The method according to claim 2, wherein the diallylamine acetate monomer concentration is 15 to 60 mass %.

* * * * *